(12) United States Patent
Roy Thill et al.

(10) Patent No.: US 11,105,215 B2
(45) Date of Patent: Aug. 31, 2021

(54) FEATHER SEAL SLOT ARRANGEMENT FOR A CMC BOAS ASSEMBLY

(71) Applicant: United Technologies Corporation, Farmington, CT (US)

(72) Inventors: Carson A. Roy Thill, South Berwick, ME (US); Jaime A. Arbona, West Palm Beach, FL (US); Justin K. Bleil, Sanford, ME (US); Danielle Mahoney, Dover, NH (US); Andrew D. Keene, Portland, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 65 days.

(21) Appl. No.: 16/675,924

(22) Filed: Nov. 6, 2019

(65) Prior Publication Data
US 2021/0131302 A1 May 6, 2021

(51) Int. Cl.
*F01D 11/08* (2006.01)

(52) U.S. Cl.
CPC .......... *F01D 11/08* (2013.01); *F05D 2220/32* (2013.01); *F05D 2240/55* (2013.01); *F05D 2300/6033* (2013.01)

(58) Field of Classification Search
CPC ... F01D 5/147; F01D 9/02; F01D 9/04; F01D 11/003; F01D 11/005; F01D 11/08; F01D 25/246; F05D 2220/32; F05D 2240/55; F05D 2300/6033
See application file for complete search history.

(56) References Cited

U.S. PATENT DOCUMENTS

| | | | | |
|---|---|---|---|---|
| 5,127,793 A | * | 7/1992 | Walker | F01D 11/08 415/115 |
| 5,165,847 A | * | 11/1992 | Proctor | F01D 11/08 415/115 |
| 6,146,091 A | * | 11/2000 | Watanabe | F01D 11/04 415/115 |
| 7,033,138 B2 | * | 4/2006 | Tomita | F01D 11/005 415/139 |
| 7,670,108 B2 | * | 3/2010 | Liang | F01D 11/005 415/173.1 |

(Continued)

FOREIGN PATENT DOCUMENTS

| | | |
|---|---|---|
| EP | 2589774 | 5/2013 |
| EP | 3091190 | 11/2016 |
| EP | 3255252 | 12/2017 |

OTHER PUBLICATIONS

Extended EP Search Report for EP Application No. 20206169.3 dated Apr. 13, 2021.

*Primary Examiner* — Igor Kershteyn
(74) *Attorney, Agent, or Firm* — Carlson, Gaskey & Olds, P.C.

(57) ABSTRACT

A flow path component includes a base portion that extends between a first circumferential side and a second circumferential side. A first wall and a second wall extend radially outward from the base portion. The first wall is axially spaced from the second wall to form a passage between the first and second walls. A slot is formed in the first circumferential side. A notch in the base portion extends in a radial direction from the passage to the slot.

20 Claims, 4 Drawing Sheets

(56) References Cited

U.S. PATENT DOCUMENTS

| | | | |
|---|---|---|---|
| 8,585,357 B2* | 11/2013 | DiPaola | .................... F01D 9/04 |
| | | | 415/173.6 |
| 9,410,439 B2 | 8/2016 | Luczak | |
| 9,416,675 B2* | 8/2016 | Lacy | ....................... F16J 15/02 |
| 2011/0171011 A1* | 7/2011 | Lutjen | .................... F01D 11/04 |
| | | | 415/173.5 |
| 2013/0051979 A1 | 2/2013 | Durocher | |
| 2016/0201910 A1 | 7/2016 | Chang | |
| 2018/0156069 A1 | 6/2018 | Quennehen | |
| 2018/0371947 A1 | 12/2018 | Sippel | |
| 2020/0255344 A1 | 8/2020 | Carlin et al. | |

* cited by examiner

FEATHER SEAL SLOT ARRANGEMENT FOR A CMC BOAS ASSEMBLY

BACKGROUND

This application relates to an arrangement for a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Some gas turbine engine components are formed from ceramic materials.

SUMMARY OF THE INVENTION

In one exemplary embodiment, a flow path component includes a base portion that extends between a first circumferential side and a second circumferential side. A first wall and a second wall extend radially outward from the base portion. The first wall is axially spaced from the second wall to form a passage between the first and second walls. A slot is formed in the first circumferential side. A notch in the base portion extends in a radial direction from the passage to the slot.

In a further embodiment of any of the above, the notch extends in an axial direction from the first wall to the second wall.

In a further embodiment of any of the above, the slot extends in the axial direction beyond the first wall and the second wall.

In a further embodiment of any of the above, the notch has a width in an axial direction that is at least about 0.14 inches (3.56 mm).

In a further embodiment of any of the above, the notch has a depth in a circumferential direction of at least about 0.05 inches (1.27 mm).

In a further embodiment of any of the above, the slot is configured to receive a feather seal and the notch is radially outward of the feather seal.

In a further embodiment of any of the above, a second slot is formed in the second circumferential side and a second notch extends in the radial direction from the passage to the second slot.

In a further embodiment of any of the above, the component is a ceramic material.

In a further embodiment of any of the above, the component is formed from a plurality of CMC laminate sheets. An overwrap ply is arranged outward of the plurality of CMC laminate sheets.

In a further embodiment of any of the above, the component is a blade outer air seal.

In another exemplary embodiment, a flow path component assembly includes a flow path component that has a plurality of segments that extends circumferentially about an axis and is mounted in a carrier. At least one of the plurality of segments have a base portion that extends from a first circumferential side to a second circumferential side. A first wall and a second wall extend radially outward from the base portion. The first wall is axially spaced from the second wall to form a passage between the first and second walls. A slot is formed in the first circumferential side. A notch in the base portion extends in a radial direction from the passage to the slot.

In a further embodiment of any of the above, a feather seal is arranged in the slot.

In a further embodiment of any of the above, the notch has a width in an axial direction that is at least about 0.14 inches (3.56 mm).

In a further embodiment of any of the above, the notch has a depth in a circumferential direction of at least about 0.05 inches (1.27 mm).

In a further embodiment of any of the above, the slot is arranged about halfway between a radially inner side and a radially outer side of the at least one segment.

In a further embodiment of any of the above, the at least one segment is formed from a ceramic material.

In another exemplary embodiment, a method of manufacturing a flow path component includes laying a plurality of laminate sheets to form a body. Excess material is machined off the body to form a segment that has first and second walls that extend from a base portion to define a passage between the first and second walls. The base portion is machined to define a slot in a first circumferential side. A notch is machined in the base portion that extends between the passage and the slot.

In a further embodiment of any of the above, the method includes densifying the body.

In a further embodiment of any of the above, the slot and the notch are machined in a single operation.

In a further embodiment of any of the above, the notch is formed via ultrasonic machining.

DETAILED DESCRIPTION

Figure 1:
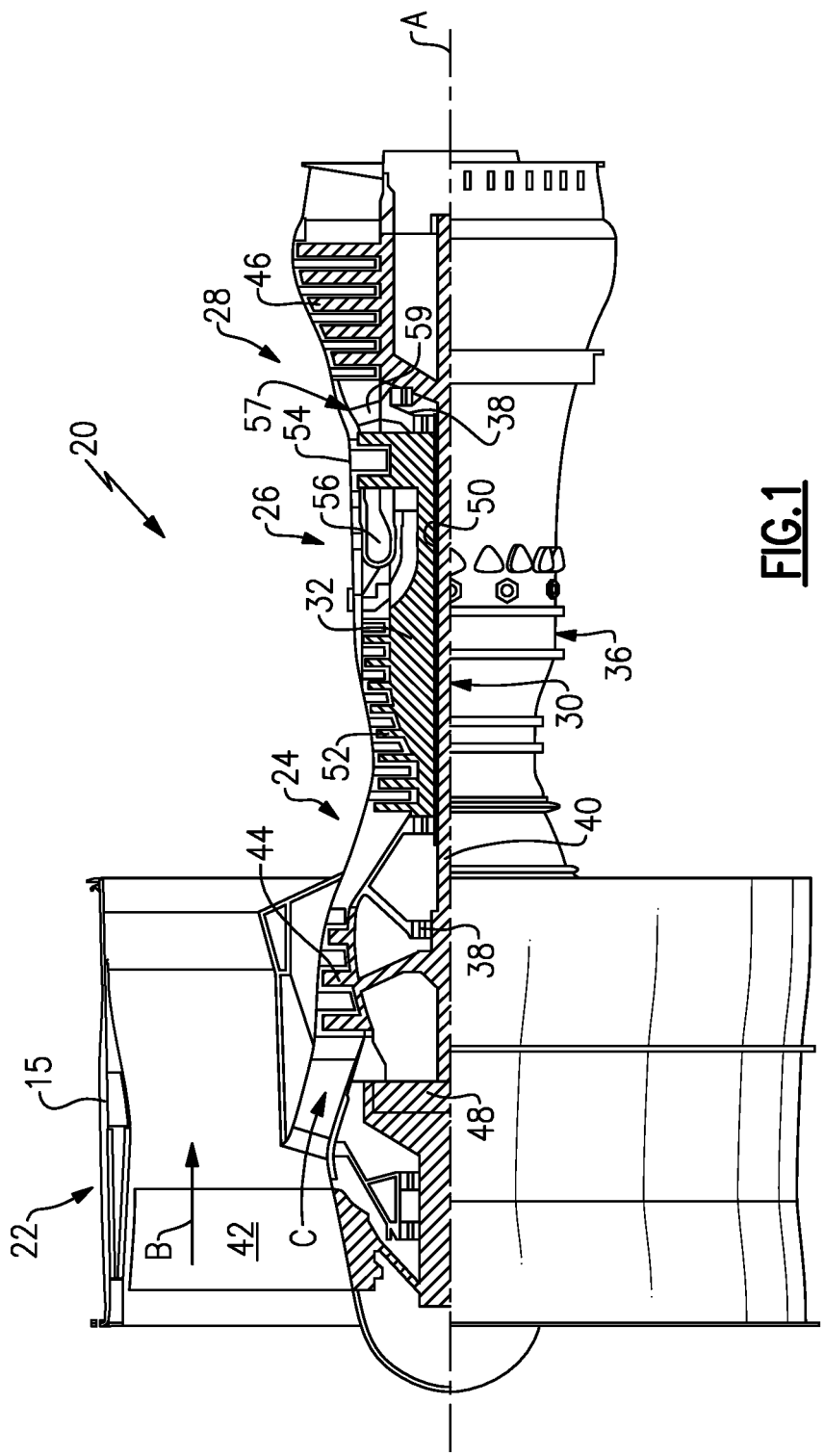
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
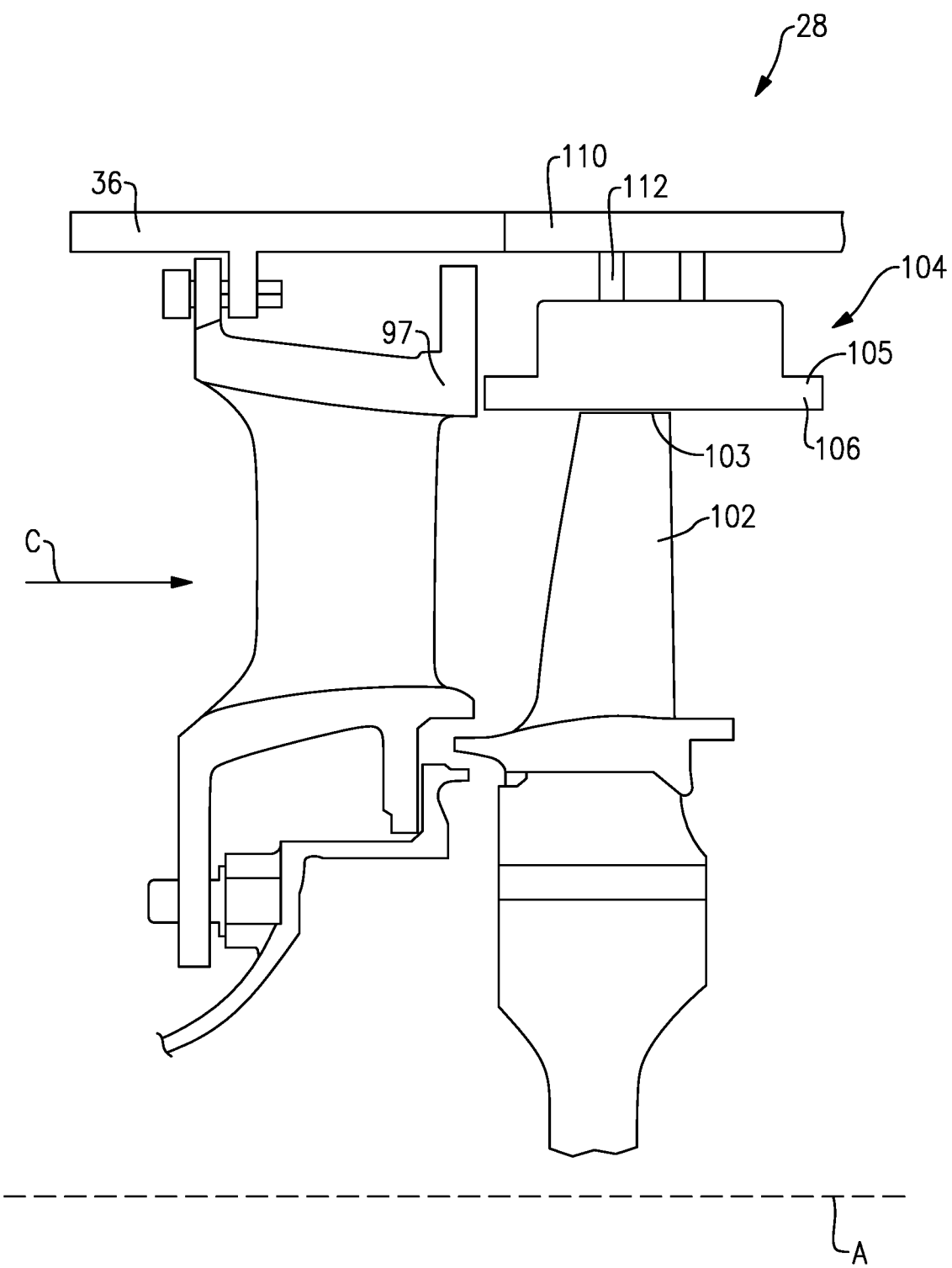
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20.

The BOAS 106 may be mounted to an engine case or structure, such as engine static structure 36 via a control ring or support structure 110 and a carrier 112. The engine structure 36 may extend for a full 360° about the engine axis A. The support structure 110 and/or carrier 112 may be segmented, in some examples. The engine structure 36 may support the support structure 110 via a hook or other attachment means. The engine case or support structure holds the BOAS 106 radially outward of the turbine blades 102. Although a BOAS 106 is described, this disclosure may apply to other components, and particularly flow path components. For example, this disclosure may apply to combustor liner panels, shroud, transition ducts, exhaust nozzle liners, or other CMC components.

Figure 3:
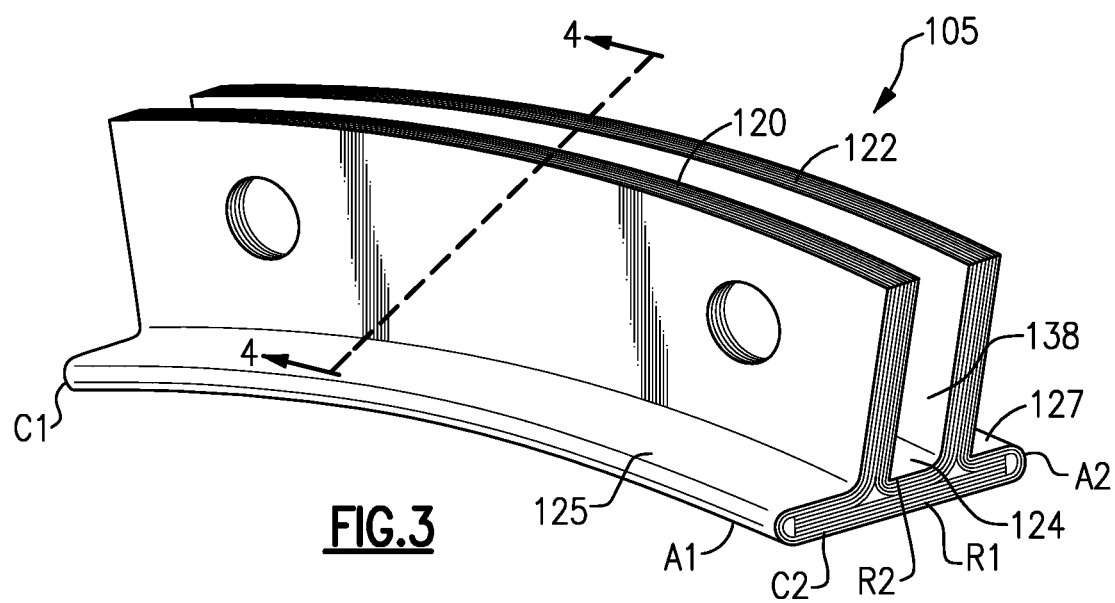
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 axially spaced from a second wall 122. The first and second walls 120, 122 extend generally radially outward from a base portion 124. The first and second walls 120, 122 extend along a circumferential length of the seal segment 105. In the illustrated example, the first and second walls 120, 122 are substantially parallel to one another and perpendicular to the base portion 124. In other examples, the first and second walls 120, 122 may be arranged at an angle. The first and second walls 120, 122 define a circumferentially extending passage 138. The base portion 124 extends between the first and second axial sides A1, A2 and defines a gas path on a radially inner side and a non-gas path on a radially outer side. The base portion 124 may extend axially forward of the first wall 120 to form a forward portion 125 and axially aft of the second wall 122 to form an aft portion 127. In this disclosure, forward, aft, upstream, downstream, axial, radial, or circumferential is in relation to the engine axis A unless stated otherwise.

The BOAS 106 may be formed of a ceramic matrix composite ("CMC") material. Each seal segment 105 is formed of a plurality of CMC laminate sheets. The laminate sheets may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further processed by adding additional material to coat the laminate sheets. The simple arrangement of the base portion 124 and first and second walls 120, 122 allows for a simple ply layup.

Figure 4:
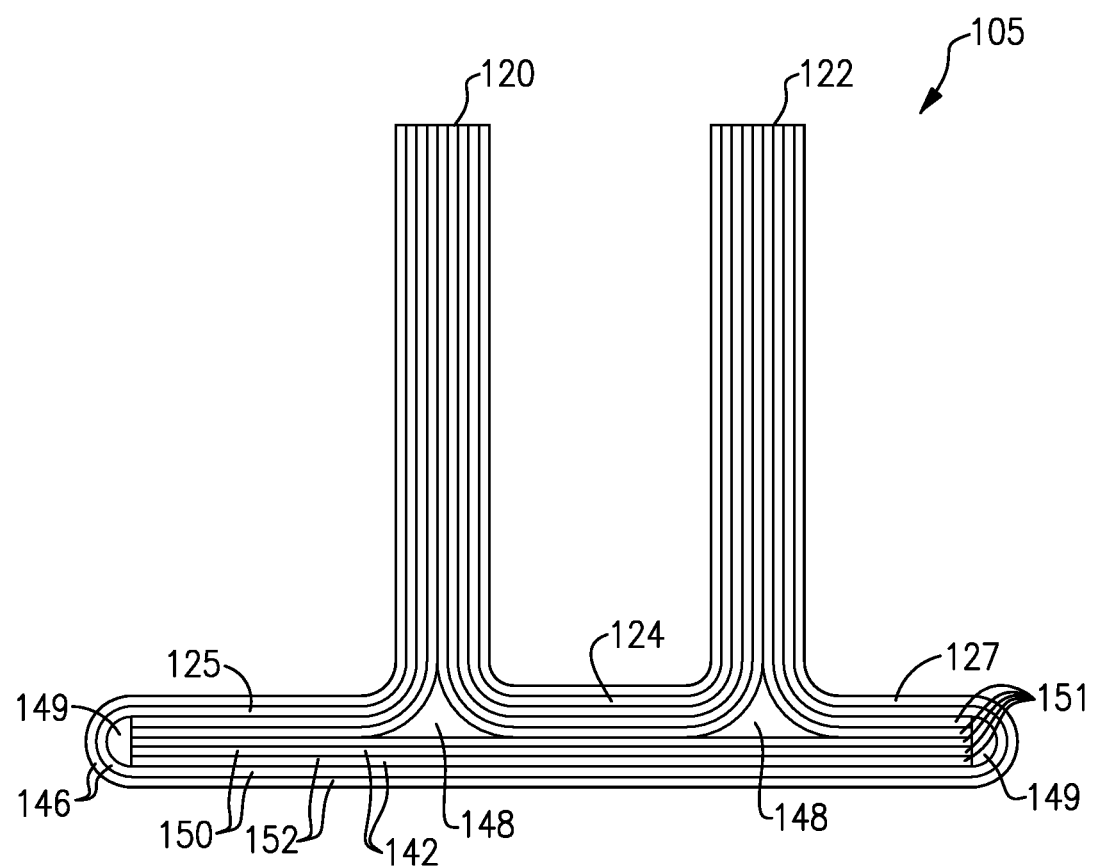
FIG. 4 illustrates a cross-section of the exemplary blade outer air seal.

FIG. 4 illustrates a cross-sectional view of the example BOAS segment 105, showing an exemplary ply layup. In some examples, the base portion 124 and first and second walls 120, 122 may be formed from the same number of laminate plies, and thus have substantially the same thickness. A plurality of plies 142 are layered to form the BOAS segment 105. The plies 142 may be a braided or woven CMC material, such as 8-Harness Satin weave, for example. In this example, wraparound plies 146 form the outermost layers of the BOAS segment 105. The wraparound plies 146 extend about the base portion 124 and up the first and second walls 120, 122. The wraparound plies 146 cover the ends of the plies 142 in the base portion 124. Covering the exposed ends prevents the ends from being exposed to the gas path flow, which may cause delamination. In the illustrated example, two wraparound plies 146 are utilized. In other examples, more or fewer wraparound plies 146 may be used.

Some of the plies 142, 146 may alternate fiber orientation. For example, some of the layers 152 are oriented such that the ceramic fibers extend at 0° and 90°, while other layers 150 are oriented such that the ceramic fibers extend at 45°. In the illustrated example, one of the wraparound plies 146 is a 0°/90° layer 152, and the other wraparound ply 146 is a 45° layer 150. Some of the other plies 142 within the base portion 124 and first and second walls 120, 122 may also alternate between layers 152, 150. This alternating arrangement may strengthen the BOAS segment 105, and improve durability. The ply arrangement may also allow for a tighter bend radius, which may lower the number of plies needed to define the base portion 124. In some examples, the ply arrangement forms gaps 148 near the first and second axial sides and where the first and second walls 120, 122 meet the base portion 124. In some examples, the ply arrangement forms gaps 149 near the first and second axial sides A1, A2. These gaps 148, 149 may be filled with a filler material, for example. In other examples, no wraparound plies 146 or gaps 149 are used, while internal plies 151 and gaps 148 remain. Although an example BOAS ply arrangement is disclosed, other arrangements may fall within the scope of this disclosure.

Figure 5:
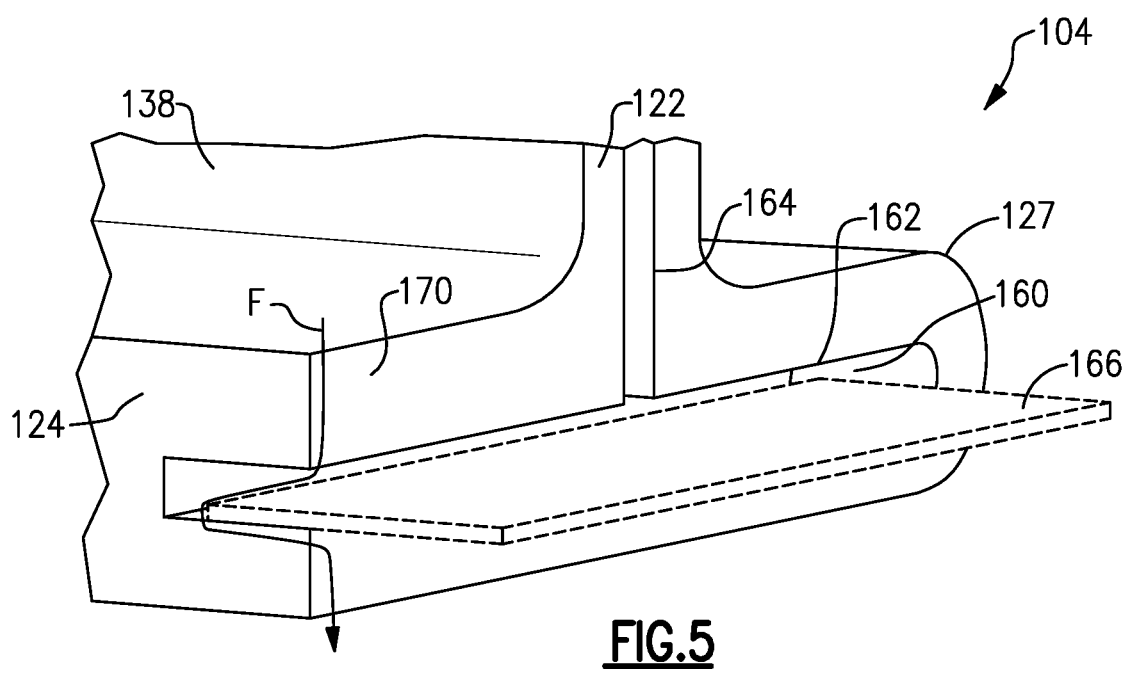
FIG. 5 illustrates a portion of an exemplary blade outer air seal assembly.

FIG. 5 illustrates a portion of the BOAS segment 105 before machining is completed. The blade outer air seal assembly 104 includes a feather seal slot 160. The feather seal slot 160 may be about halfway between the radially inner and outer sides R1, R2. The slot 160 may include an axial portion 162 and a radial portion 164. The radial portion 164 may extend up one or both of the walls 120, 122. The axial portion 162 may extend into the base portion 124 forward and aft of the walls 120, 122, for example. A feather seal 166 may be arranged in the slot 160. Although a flat feather seal 166 is shown, a curved, bent, or other feather seal configuration may be utilized. The feather seal 166 may be a metallic component, for example. A portion 170 of the BOAS segment 105 may create large thermal gradients. The portion 170 is part of the base portion 124 radially outward of the feather seal slot 160, and is thus thinner than a total thickness of the base portion 124. The portion 170 is located between the first and second walls 120, 122. The portion 170 has a large surface area exposed to the flow of fluid F in comparison to the volume. This may result in a high temperature gradient within the BOAS segment 105.

Figure 6:
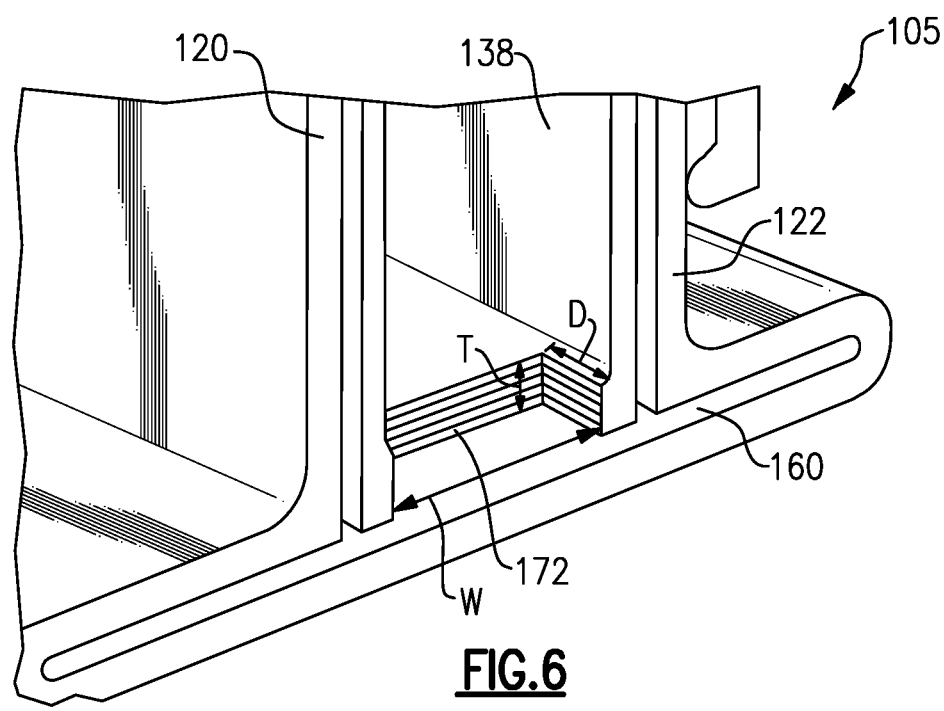
FIG. 6 illustrates a portion of the exemplary blade outer air seal.

FIG. 6 illustrates a portion of the BOAS segment 105. A notch 172 is machined into the portion 170 of the BOAS segment 105. The notch 172 may be machined via ultrasonic machining, for example. The notch 172 thus eliminates the portion 170 that may produce a high temperature gradient. The portions of the feather seal slot 160 forward and aft of the first and second walls 120, 122 maintain the feather seal 166 in position in the radial direction. The notch 172 thus extends in the radial direction from the passage 138 to the feather seal slot 160. The notch 172 will leave a portion of the feather seal 166 exposed to the flow F. The notch 172 is radially outward of the feather seal slot 160.

The notch 172 has a width W in the axial direction, a depth D in the circumferential direction, and a thickness T in the radial direction. In one example, the width W extends substantially from the first wall 120 to the second wall 122. In other examples, the width W may be less than a distance between the first and second walls 120, 122. The width W may be between about 0.14 and 0.34 inches (3.56-8.64 mm), for example. The depth D may be about the same depth as a depth of the feather seal slot 160. The depth D may be between about 0.05 and 0.25 inches (1.27-6.35 mm), for example. The thickness T extends through all of the ply laminates in the portion 170 radially outward of the slot 160. The thickness T may be between about 0.01 and 0.16 inches (0.25-4.06 mm), for example. In another example where the BOAS segment 105 is much larger, the width W, depth D, and thickness T may be proportionally larger. The notch 172 may be machined into the BOAS segment 105 at the same time as the feather seal slot 160, in some examples. In other examples, the notch 172 may be machined into the BOAS segment 105 before or after the feather seal slot 160.

Known CMC components with a feather seal slot can have thin portions of material that are subject to localized cooling effects compared to neighboring material. This localized cooling effect results in different thermal states within a particular component, which may produce stresses and cause local failure. The disclosed notch arrangement removes a portion of a BOAS segment that is subject to localized cooling, which may help reduce thermal differences within the component. The removal of the material at the notch may reduce the possibility of local failure.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A flow path component, comprising:
   a base portion extending between a first circumferential side and a second circumferential side;
   a first wall and a second wall extending radially outward from the base portion, the first wall axially spaced from the second wall to form a passage between the first and second walls;
   a slot formed in the first circumferential side;
   a notch in the base portion extending in a radial direction from the passage to the slot; and
   the component is a ceramic material and the component is formed from a plurality of CMC laminate sheets, and an overwrap ply is arranged outward of the plurality of CMC laminate sheets.

2. The flow path component of claim 1, wherein the notch extends in an axial direction from the first wall to the second wall.

3. The flow path component of claim 1, wherein the slot extends in the axial direction beyond the first wall and the second wall.

4. The flow path component of claim 1, wherein the notch has a width in an axial direction that is at least about 0.14 inches (3.56 mm).

5. The flow path component of claim 1, wherein the notch has a depth in a circumferential direction of at least about 0.05 inches (1.27 mm).

6. The flow path component of claim 1, wherein the slot is configured to receive a feather seal and the notch is radially outward of the feather seal.

7. The flow path component of claim 1, wherein a second slot is formed in the second circumferential side and a second notch extends in the radial direction from the passage to the second slot.

8. The flow path component of claim 1, wherein the component is a blade outer air seal.

9. The flow path component of claim 1, wherein the overwrap ply covers ends of the CMC laminate sheets in the base portion.

10. The flow path component of claim 1, wherein the component comprises a second overwrap ply, the second overwrap ply having a different fiber orientation than the overwrap ply.

11. A flow path component assembly, comprising:
    a flow path component having a plurality of segments extending circumferentially about an axis and mounted in a carrier;
    at least one of the plurality of segments having a base portion extending from a first circumferential side to a second circumferential side, a first wall and a second wall extending radially outward from the base portion, the first wall axially spaced from the second wall to form a passage between the first and second walls, a slot formed in the first circumferential side, and a notch in the base portion extending in a radial direction from the passage to the slot, wherein the at least one segment is formed from a ceramic material, the at least one segment formed from a plurality of CMC laminate sheets, and an overwrap ply is arranged outward of the plurality of CMC laminate sheets.

12. The flow path component assembly of claim 11, wherein a feather seal is arranged in the slot.

13. The flow path component assembly of claim 11, wherein the notch has a width in an axial direction that is at least about 0.14 inches (3.56 mm).

14. The flow path component assembly of claim 13, wherein the notch has a depth in a circumferential direction of at least about 0.05 inches (1.27 mm).

15. The flow path component assembly of claim 11, wherein the slot is arranged about halfway between a radially inner side and a radially outer side of the at least one segment.

16. A method of manufacturing a flow path component, comprising:
    laying a plurality of laminate sheets to form a body;
    machining excess material off the body to form a segment having first and second walls extending from a base portion to define a passage between the first and second walls;
    machining the base portion to define a slot in a first circumferential side; and
    machining a notch in the base portion extending between the passage and the slot.

17. The method of claim 16, comprising densifying the body.

18. The method of claim 16, comprising machining the slot and the notch in a single operation.

19. The method of claim 16, wherein the notch is formed via ultrasonic machining.

20. The method of claim 16, wherein the laying a plurality of laminate sheets to form a body comprises wrapping an overwrap ply about at least some of the plurality of laminate sheets.

* * * * *